United States Patent
Jungnickel et al.

(10) Patent No.: US 12,245,685 B2
(45) Date of Patent: Mar. 11, 2025

(54) MANUAL TOOTHBRUSH HAVING REPLACEABLE HEAD

(71) Applicant: The Gillette Company LLC, Boston, MA (US)

(72) Inventors: Uwe Jungnickel, Königstein (DE); Jens Alinski, Kelkheim (DE)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/354,027

(22) Filed: Jun. 22, 2021

(65) Prior Publication Data
US 2021/0307496 A1    Oct. 7, 2021

Related U.S. Application Data

(63) Continuation of application No. 16/272,872, filed on Feb. 11, 2019, now Pat. No. 11,553,782.

(30) Foreign Application Priority Data

Feb. 9, 2018    (EP) .................................... 18156000

(51) Int. Cl.
A46B 5/00    (2006.01)
A46B 7/04    (2006.01)
(Continued)

(52) U.S. Cl.
CPC .............. *A46B 5/0095* (2013.01); *A46B 7/04* (2013.01); *A46B 13/08* (2013.01);
(Continued)

(58) Field of Classification Search
CPC ... H01R 13/6276; A61C 17/222; A61C 17/00; A46B 15/0044; A46B 13/08; A46B 7/04; A46B 5/0095
(Continued)

(56) References Cited

U.S. PATENT DOCUMENTS 3,103,680 A    9/1963    Abraham
3,445,966 A    5/1969    Moore
(Continued)

FOREIGN PATENT DOCUMENTS

CA    2877731 A1    11/2009
CN    2131361 Y     5/1993
(Continued)

OTHER PUBLICATIONS

All Office Actions; U.S. Appl. No. 17/511,103, filed Oct. 26, 2021.
(Continued)

*Primary Examiner* — Katina N. Henson
(74) *Attorney, Agent, or Firm* — Jay A. Krebs; Jason J. Camp

(57) ABSTRACT

A replaceable head for removeable connection with a manual toothbrush handle, the head comprising: a first end, a second end opposite to the first end, a neck having a hollow portion therein and extending between the first end and the second end, and a bristle carrier disposed adjacent to the first end. The second end comprises a second-end opening leading into the hollow portion of the neck and terminates with a second-end edge comprising a chamfered surface structured and configured to mate with a corresponding chamfered surface of the handle when the head is connected thereto. The neck's hollow portion is defined by an inner wall comprising a recess for receiving a spring-loaded ball associated with a connector of the handle.

9 Claims, 6 Drawing Sheets

(51) Int. Cl.
  *A46B 13/08* (2006.01)
  *A46B 15/00* (2006.01)
  *A61C 17/00* (2006.01)
  *A61C 17/22* (2006.01)
  *H01R 13/627* (2006.01)
  *A46B 9/04* (2006.01)

(52) U.S. Cl.
  CPC .......... *A46B 15/0044* (2013.01); *A61C 17/00* (2013.01); *A61C 17/222* (2013.01); *H01R 13/6276* (2013.01); *A46B 9/04* (2013.01); *A46B 2200/1066* (2013.01); *A61C 17/225* (2013.01); *H01R 2201/12* (2013.01)

(58) Field of Classification Search
  USPC ........................................................ 15/167.1
  See application file for complete search history.

(56) References Cited

U.S. PATENT DOCUMENTS

| | | | |
|---|---|---|---|
| 3,735,492 | A | 5/1973 | Karter |
| 3,927,435 | A | 12/1975 | Moret |
| 4,384,645 | A | 5/1983 | Manfredi |
| 4,461,053 | A | 7/1984 | Nitzsche et al. |
| 4,811,445 | A | 3/1989 | Lagieski et al. |
| 5,109,563 | A | 5/1992 | Lemon et al. |
| 5,137,039 | A | 8/1992 | Klinkhammer |
| 5,233,891 | A | 8/1993 | Arnold |
| 5,335,389 | A | 8/1994 | Curtis et al. |
| 5,361,446 | A | 11/1994 | Rufo |
| 5,369,835 | A | 12/1994 | Clarke |
| 5,515,754 | A | 5/1996 | Elkins |
| 5,533,429 | A | 7/1996 | Kozak |
| 5,575,443 | A | 11/1996 | Honeycutt |
| 5,815,872 | A | 10/1998 | Meginniss et al. |
| 5,875,510 | A | 3/1999 | Lamond et al. |
| 5,956,796 | A | 9/1999 | Lodato |
| 5,992,423 | A * | 11/1999 | Tevolini .............. A45D 20/525 15/176.1 |
| 5,994,855 | A | 11/1999 | Lundell |
| 6,015,328 | A | 1/2000 | Glaser |
| 6,042,156 | A | 3/2000 | Jackson |
| 6,086,373 | A | 7/2000 | Schiff |
| 6,115,870 | A | 9/2000 | Solanki et al. |
| 6,223,391 | B1 | 5/2001 | Kuo |
| 6,230,716 | B1 * | 5/2001 | Minoletti ................ A45D 6/04 132/226 |
| 6,276,019 | B1 | 8/2001 | Leversby |
| 6,308,367 | B1 | 10/2001 | Beals et al. |
| 6,345,406 | B1 | 2/2002 | Dodd |
| 6,546,585 | B1 | 4/2003 | Blaustein |
| 6,643,886 | B2 | 11/2003 | Moskovich |
| 6,671,919 | B2 | 1/2004 | Davis |
| 6,715,211 | B1 | 4/2004 | Chi |
| 6,871,373 | B2 | 3/2005 | Driesen |
| 6,872,325 | B2 | 3/2005 | Bandyopadhyay et al. |
| 6,954,961 | B2 | 10/2005 | Ferber et al. |
| 6,968,590 | B2 | 11/2005 | Ponzini |
| 6,978,504 | B1 | 12/2005 | Smith et al. |
| 7,055,205 | B2 | 6/2006 | Aoyama |
| 7,137,166 | B1 | 11/2006 | Kraemer |
| 7,240,390 | B2 | 7/2007 | Pfenniger et al. |
| 7,458,125 | B2 | 12/2008 | Hohlbein |
| 7,877,832 | B2 | 2/2011 | Reinbold |
| 7,960,473 | B2 | 6/2011 | Kobayashi |
| 8,210,580 | B2 | 7/2012 | Engel et al. |
| 8,308,246 | B2 | 11/2012 | Chung |
| 8,387,197 | B2 | 3/2013 | Moskovich |
| 8,544,131 | B2 | 10/2013 | Braun et al. |
| 8,549,691 | B2 | 10/2013 | Moskovich et al. |
| 8,563,020 | B2 | 10/2013 | Uhlmann |
| 8,701,235 | B2 | 4/2014 | Kressner |
| 8,727,141 | B2 | 5/2014 | Akalin |
| 8,763,189 | B2 | 7/2014 | Jungnickel et al. |
| 8,763,196 | B2 | 7/2014 | Kraemer |
| 8,769,758 | B2 | 7/2014 | Jungnickel et al. |
| 8,800,093 | B2 | 8/2014 | Moskovich et al. |
| 8,931,855 | B1 | 1/2015 | Foley et al. |
| 8,955,185 | B2 | 2/2015 | Huy |
| 8,966,697 | B2 | 3/2015 | Kim et al. |
| 8,985,593 | B1 | 3/2015 | Gao |
| 9,049,921 | B1 | 6/2015 | Rackston |
| 9,066,579 | B2 | 6/2015 | Hess |
| 9,126,346 | B2 | 9/2015 | Meier et al. |
| 9,161,544 | B2 | 10/2015 | Agrawal et al. |
| 9,168,117 | B2 | 10/2015 | Yoshida et al. |
| 9,226,508 | B2 | 1/2016 | Uhlmann et al. |
| 9,265,335 | B2 | 2/2016 | Foley et al. |
| 9,402,461 | B2 | 8/2016 | Brik et al. |
| 9,427,077 | B1 | 8/2016 | Zhang |
| 9,486,066 | B2 | 11/2016 | Bresselschmidt |
| D775,469 | S | 1/2017 | Sikora et al. |
| 9,538,836 | B2 | 1/2017 | Mintel et al. |
| 9,539,750 | B2 | 1/2017 | Gross et al. |
| 9,572,553 | B2 | 2/2017 | Post |
| 9,596,928 | B2 | 3/2017 | Pardo et al. |
| 9,609,940 | B2 | 4/2017 | Corbett |
| 9,635,928 | B2 | 5/2017 | Morgott |
| 9,642,682 | B2 | 5/2017 | Kato |
| 9,737,134 | B2 | 8/2017 | Moskovich |
| 9,775,693 | B2 | 10/2017 | Fattori |
| 9,848,968 | B2 | 12/2017 | Jungnickel |
| 9,865,184 | B2 | 1/2018 | Jungnickel et al. |
| D814,195 | S | 4/2018 | Sikora et al. |
| 9,987,109 | B2 | 6/2018 | Sokol et al. |
| 9,993,066 | B2 | 6/2018 | Bresselschmidt et al. |
| 10,021,959 | B2 | 7/2018 | Jimenez et al. |
| 10,021,962 | B2 | 7/2018 | Tschol et al. |
| 10,058,089 | B1 | 8/2018 | Stephens |
| 10,149,532 | B2 | 12/2018 | Tschol et al. |
| 10,182,644 | B2 | 1/2019 | Jimenez et al. |
| 10,189,972 | B2 | 1/2019 | Stibor et al. |
| 10,195,005 | B2 | 2/2019 | Wallström et al. |
| 10,244,855 | B2 | 4/2019 | Wechsler |
| 10,244,857 | B2 | 4/2019 | Nelson et al. |
| 10,314,387 | B2 | 6/2019 | Jungnickel et al. |
| 10,413,390 | B2 | 9/2019 | Yao |
| 10,548,393 | B2 | 2/2020 | Xi et al. |
| 10,561,481 | B2 | 2/2020 | Fugger |
| 10,639,133 | B2 | 5/2020 | Bloch et al. |
| 10,642,228 | B1 | 5/2020 | Cardinali et al. |
| 10,660,430 | B2 | 5/2020 | Jimenez et al. |
| 10,660,733 | B2 | 5/2020 | Schaefer et al. |
| 10,667,892 | B2 | 6/2020 | Bärtschi et al. |
| 10,743,646 | B2 | 8/2020 | Jimenez et al. |
| 10,758,327 | B2 | 9/2020 | Katano et al. |
| 10,792,136 | B2 | 10/2020 | May et al. |
| D901,183 | S | 11/2020 | Jungnickel et al. |
| 10,842,255 | B2 | 11/2020 | Görich et al. |
| 10,874,205 | B2 | 12/2020 | Alinski et al. |
| D912,988 | S | 3/2021 | Langhammer |
| D917,298 | S | 4/2021 | Hallein et al. |
| D926,048 | S | 7/2021 | Hallein et al. |
| D926,049 | S | 7/2021 | Hallein et al. |
| 11,051,605 | B2 | 7/2021 | Tschol |
| D927,972 | S | 8/2021 | Hallein et al. |
| D930,990 | S | 9/2021 | Hallein et al. |
| D931,617 | S | 9/2021 | Hallein et al. |
| D931,619 | S | 9/2021 | Hallein et al. |
| D933,368 | S | 10/2021 | Albay et al. |
| D936,484 | S | 11/2021 | Hallein et al. |
| 11,219,302 | B2 | 1/2022 | Alinski et al. |
| 11,364,102 | B2 | 6/2022 | Barnes et al. |
| 11,375,802 | B2 | 7/2022 | Jungnickel |
| 11,382,409 | B2 | 7/2022 | Jungnickel et al. |
| 11,388,984 | B2 | 7/2022 | Jungnickel |
| 11,388,985 | B2 | 7/2022 | Jungnickel et al. |
| 11,399,622 | B2 | 8/2022 | Jungnickel |
| 11,400,627 | B2 | 8/2022 | Jungnickel et al. |
| 11,425,991 | B2 | 8/2022 | Stoerkel et al. |
| 11,547,116 | B2 | 1/2023 | Wingfield et al. |
| 11,553,782 | B2 | 1/2023 | Jungnickel et al. |
| 11,553,784 | B2 | 1/2023 | Jungnickel |

(56) References Cited

U.S. PATENT DOCUMENTS

| | | |
|---|---|---|
| 11,553,999 B2 | 1/2023 | Scherrer et al. |
| 11,571,060 B2 | 2/2023 | Jungnickel |
| 11,659,922 B2 | 5/2023 | Jungnickel |
| 11,672,633 B2 | 6/2023 | Jungnickel et al. |
| 11,684,148 B2 | 6/2023 | Farrell et al. |
| D998,974 S | 9/2023 | Albay |
| 11,865,748 B2 | 1/2024 | Jungnickel |
| D1,019,146 S | 3/2024 | Albay |
| 2001/0035079 A1 | 11/2001 | Kesinger et al. |
| 2003/0077107 A1 | 4/2003 | Kuo |
| 2003/0080474 A1 | 5/2003 | Boland |
| 2003/0115706 A1 | 6/2003 | Ponzini |
| 2003/0131427 A1 | 7/2003 | Hilscher et al. |
| 2003/0205492 A1 | 11/2003 | Ferber et al. |
| 2004/0016073 A1 | 1/2004 | Knutson |
| 2004/0060138 A1 | 4/2004 | Pfenniger et al. |
| 2004/0187889 A1 | 9/2004 | Kemp et al. |
| 2005/0022322 A1 | 2/2005 | Jimenez et al. |
| 2005/0268414 A1 | 12/2005 | Kim |
| 2005/0286967 A1 | 12/2005 | Blauzdys |
| 2006/0021173 A1 | 2/2006 | Huber |
| 2006/0086370 A1 | 4/2006 | Omeara |
| 2007/0071541 A1 | 3/2007 | Vila |
| 2007/0222109 A1 | 9/2007 | Pfenniger et al. |
| 2008/0022484 A1 | 1/2008 | Caruso |
| 2008/0120795 A1 | 5/2008 | Reinbold |
| 2008/0183249 A1 | 7/2008 | Kitagawa et al. |
| 2008/0220235 A1 | 9/2008 | Izumi |
| 2009/0089950 A1 | 4/2009 | Moskovich et al. |
| 2009/0144920 A1 | 6/2009 | Nanda |
| 2010/0115724 A1 | 5/2010 | Huang |
| 2010/0263148 A1 | 10/2010 | Jimenez |
| 2010/0282274 A1 | 11/2010 | Huy |
| 2011/0016651 A1 | 1/2011 | Piserchio |
| 2011/0047729 A1 | 3/2011 | Iwahori et al. |
| 2011/0146015 A1 | 6/2011 | Moskovich |
| 2011/0225758 A1 | 9/2011 | Chung |
| 2011/0265818 A1 | 11/2011 | Jungnickel et al. |
| 2011/0314677 A1 | 12/2011 | Meier et al. |
| 2012/0036663 A1 | 2/2012 | Chen |
| 2012/0073072 A1 | 3/2012 | Moskovich et al. |
| 2012/0090117 A1 | 4/2012 | Akalin |
| 2012/0096665 A1 | 4/2012 | Ponzini |
| 2012/0112566 A1 | 5/2012 | Doll |
| 2012/0192366 A1 | 8/2012 | Cobabe et al. |
| 2012/0198640 A1 | 8/2012 | Jungnickel et al. |
| 2012/0227200 A1 | 9/2012 | Kraemer |
| 2012/0272923 A1 | 11/2012 | Stephens |
| 2012/0301528 A1 | 11/2012 | Uhlmann et al. |
| 2012/0301530 A1 | 11/2012 | Uhlmann et al. |
| 2012/0301531 A1 | 11/2012 | Uhlmann et al. |
| 2012/0301533 A1 | 11/2012 | Uhlmann et al. |
| 2013/0000059 A1 | 1/2013 | Jungnickel et al. |
| 2013/0000061 A1 | 1/2013 | Park |
| 2013/0171225 A1 | 7/2013 | Uhlmann et al. |
| 2013/0291326 A1 | 11/2013 | Mintel |
| 2013/0308994 A1 | 11/2013 | Wu et al. |
| 2013/0315972 A1 | 11/2013 | Krasnow et al. |
| 2014/0012165 A1 | 1/2014 | Cockley |
| 2014/0137349 A1 | 5/2014 | Newman |
| 2014/0151931 A1 | 6/2014 | Altonen et al. |
| 2014/0259474 A1 | 9/2014 | Sokol et al. |
| 2014/0359957 A1 | 12/2014 | Jungnickel |
| 2014/0359958 A1 | 12/2014 | Jungnickel |
| 2014/0359959 A1 | 12/2014 | Jungnickel et al. |
| 2014/0371729 A1* | 12/2014 | Post ............... A61B 17/00 606/1 |
| 2015/0010765 A1 | 1/2015 | Munro |
| 2015/0034858 A1 | 2/2015 | Raman |
| 2015/0107423 A1 | 4/2015 | Martn |
| 2015/0128367 A1 | 5/2015 | Jungnickel et al. |
| 2015/0143651 A1 | 5/2015 | Foley et al. |
| 2015/0147372 A1 | 5/2015 | Agrawal et al. |
| 2015/0170811 A1 | 6/2015 | Tanigawa et al. |
| 2015/0173502 A1 | 6/2015 | Sedic |
| 2015/0245618 A9 | 9/2015 | Agrawal et al. |
| 2015/0289635 A1 | 10/2015 | Erskine-Smith |
| 2015/0305487 A1 | 10/2015 | Pardo et al. |
| 2015/0351406 A1 | 12/2015 | Wingfield et al. |
| 2016/0081465 A1 | 3/2016 | Metter |
| 2016/0135579 A1 | 5/2016 | Tschol et al. |
| 2016/0135580 A1 | 5/2016 | Tschol et al. |
| 2016/0220012 A1 | 8/2016 | Sprosta et al. |
| 2016/0220014 A1 | 8/2016 | Sprosta |
| 2016/0338807 A1 | 11/2016 | Bloch |
| 2017/0020277 A1 | 1/2017 | Barnes et al. |
| 2017/0079418 A1 | 3/2017 | Mintel |
| 2017/0333172 A1 | 11/2017 | Zheng |
| 2017/0347782 A1 | 12/2017 | Jimenez et al. |
| 2017/0347786 A1 | 12/2017 | Jimenez et al. |
| 2017/0367469 A1 | 12/2017 | Jimenez et al. |
| 2018/0016408 A1 | 1/2018 | Stibor |
| 2018/0035797 A1 | 2/2018 | Mahawar |
| 2018/0055206 A1 | 3/2018 | Nelson et al. |
| 2018/0064516 A1 | 3/2018 | Wu |
| 2018/0087631 A1 | 3/2018 | Kramp et al. |
| 2018/0092449 A1 | 4/2018 | Straka et al. |
| 2018/0110601 A1 | 4/2018 | Mighall et al. |
| 2018/0140404 A1 | 5/2018 | Schaefer et al. |
| 2018/0168326 A1 | 6/2018 | Davies-Smith et al. |
| 2018/0235355 A1 | 8/2018 | Jungnickel et al. |
| 2018/0311023 A1 | 11/2018 | Yao |
| 2019/0000223 A1 | 1/2019 | Alinski |
| 2019/0029787 A1 | 1/2019 | Zhou |
| 2019/0069978 A1 | 3/2019 | Katano et al. |
| 2019/0104835 A1 | 4/2019 | Alinski |
| 2019/0117356 A1 | 4/2019 | Bärtschi et al. |
| 2019/0174906 A1 | 6/2019 | Bloch |
| 2019/0175320 A1 | 6/2019 | Bloch et al. |
| 2019/0200740 A1 | 7/2019 | Jungnickel |
| 2019/0200742 A1 | 7/2019 | Jungnickel |
| 2019/0200743 A1 | 7/2019 | Jungnickel |
| 2019/0200748 A1 | 7/2019 | Görich |
| 2019/0201745 A1 | 7/2019 | Mccarthy |
| 2019/0246779 A1 | 8/2019 | Jungnickel et al. |
| 2019/0246780 A1 | 8/2019 | Jungnickel et al. |
| 2019/0246781 A1 | 8/2019 | Jungnickel et al. |
| 2019/0248049 A1 | 8/2019 | Jungnickel et al. |
| 2019/0351463 A1 | 11/2019 | Wupendram |
| 2020/0022793 A1 | 1/2020 | Scherrer et al. |
| 2020/0031038 A1 | 1/2020 | Rodriguez Outon |
| 2020/0077778 A1 | 3/2020 | Jungnickel |
| 2020/0121069 A1 | 4/2020 | Jungnickel |
| 2020/0305588 A1 | 10/2020 | Jungnickel |
| 2020/0390228 A1 | 12/2020 | Farrell |
| 2020/0391371 A1 | 12/2020 | Nelson |
| 2021/0120948 A1 | 4/2021 | Görich et al. |
| 2021/0128286 A1 | 5/2021 | Jungnickel et al. |
| 2021/0145162 A1 | 5/2021 | Baertschi |
| 2021/0220101 A1 | 7/2021 | Jungnickel et al. |
| 2022/0142344 A1 | 5/2022 | Jungnickel |
| 2022/0142345 A1 | 5/2022 | Jungnickel |
| 2022/0142346 A1 | 5/2022 | Jungnickel |
| 2022/0142347 A1 | 5/2022 | Jungnickel |
| 2022/0143854 A1 | 5/2022 | Jungnickel |
| 2022/0143884 A1 | 5/2022 | Jungnickel |
| 2022/0145075 A1 | 5/2022 | Jungnickel |
| 2022/0146024 A1 | 5/2022 | Lin |
| 2022/0152891 A1 | 5/2022 | Jungnickel et al. |
| 2022/0408907 A1 | 12/2022 | Zwimpfer |

FOREIGN PATENT DOCUMENTS

| | | |
|---|---|---|
| CN | 2320102 | 5/1999 |
| CN | 1223834 | 7/1999 |
| CN | 1229341 A | 9/1999 |
| CN | 1229622 | 9/1999 |
| CN | 2346277 | 11/1999 |
| CN | 1241123 A | 1/2000 |
| CN | 201036392 | 3/2008 |
| CN | 201185740 | 1/2009 |
| CN | 201563874 U | 9/2010 |
| CN | 201630520 | 11/2010 |
| CN | 201675294 | 12/2010 |

(56) References Cited

FOREIGN PATENT DOCUMENTS

| | | |
|---|---|---|
| CN | 201861064 | 6/2011 |
| CN | 201861068 | 6/2011 |
| CN | 201949160 U | 8/2011 |
| CN | 202035662 | 11/2011 |
| CN | 202269590 U | 6/2012 |
| CN | 202286879 | 7/2012 |
| CN | 202476817 | 10/2012 |
| CN | 202566900 U | 12/2012 |
| CN | 102907880 | 2/2013 |
| CN | 102948997 | 3/2013 |
| CN | 202820100 | 3/2013 |
| CN | 202843252 U | 4/2013 |
| CN | 202941615 | 5/2013 |
| CN | 202959287 U | 6/2013 |
| CN | 202980745 | 6/2013 |
| CN | 103829559 | 6/2014 |
| CN | 103844575 | 6/2014 |
| CN | 104768420 A | 7/2015 |
| CN | 105054571 | 11/2015 |
| CN | 105411165 A | 3/2016 |
| CN | 205082879 | 3/2016 |
| CN | 105534002 | 5/2016 |
| CN | 205198181 U | 5/2016 |
| CN | 105750734 | 7/2016 |
| CN | 105818322 | 8/2016 |
| CN | 205568222 | 9/2016 |
| CN | 106132244 A | 11/2016 |
| CN | 106793866 A | 5/2017 |
| CN | 206714397 | 12/2017 |
| CN | 207055161 | 3/2018 |
| CN | 109259882 A | 1/2019 |
| CN | 111713845 A | 9/2020 |
| DE | 3241118 A1 | 8/1984 |
| DE | 4412301 A1 | 10/1995 |
| DE | 202005002964 | 7/2005 |
| DE | 202006019788 | 8/2007 |
| DE | 102006051649 | 5/2008 |
| DE | 202013001159 U1 | 3/2013 |
| DE | 202015002964 U1 | 8/2015 |
| EP | 0100975 A2 | 2/1984 |
| EP | 0423510 A1 | 4/1991 |
| EP | 0481553 A1 | 4/1992 |
| EP | 2117395 A2 | 11/2009 |
| EP | 2218559 A1 | 8/2010 |
| EP | 2229917 A1 | 9/2010 |
| EP | 3090646 | 11/2016 |
| EP | 3381404 A1 | 10/2018 |
| EP | 3501333 A1 | 6/2019 |
| EP | 3892236 A1 | 10/2021 |
| EP | 3892234 B1 | 11/2023 |
| FR | 2835176 | 8/2003 |
| GB | 766486 | 1/1957 |
| GB | 2278537 A | 12/1994 |
| GB | 2493409 | 2/2013 |
| GB | 2556019 A | 5/2018 |
| IN | 201817043186 A | 11/2018 |
| JP | 61020509 | 1/1986 |
| JP | S63284262 | 11/1988 |
| JP | H05305010 A | 11/1993 |
| JP | H0669408 | 3/1994 |
| JP | 2561978 | 12/1996 |
| JP | 2619825 | 6/1997 |
| JP | H1199016 A | 4/1999 |
| JP | 2003009951 | 1/2003 |
| JP | 2003245132 | 9/2003 |
| JP | 2004089471 | 3/2004 |
| JP | 2005053973 | 3/2005 |
| JP | 4076405 | 2/2008 |
| JP | 2009011621 | 1/2009 |
| JP | 2011045621 | 3/2011 |
| JP | 2011087747 | 5/2011 |
| JP | 2015231500 A | 12/2015 |
| JP | 3206625 B2 | 9/2016 |
| JP | 6160619 B2 | 6/2017 |
| JP | 3213325 | 11/2017 |
| KR | 20060042059 A | 5/2006 |
| KR | 20060098423 A | 9/2006 |
| KR | 20070013844 | 1/2007 |
| KR | 20090030829 | 3/2009 |
| KR | 20100043124 A | 4/2010 |
| KR | 101142611 | 5/2012 |
| KR | 20130006243 U | 10/2013 |
| KR | 101339558 | 12/2013 |
| KR | 200473116 | 6/2014 |
| KR | 20150057308 | 5/2015 |
| KR | 20150105813 | 9/2015 |
| KR | 20160000035 A | 1/2016 |
| KR | 101591299 | 2/2016 |
| KR | 20160121554 A | 10/2016 |
| KR | 20160125725 | 11/2016 |
| KR | 20170062779 | 6/2017 |
| KR | 101847473 B1 | 4/2018 |
| KR | 200486759 Y1 | 6/2018 |
| KR | 101987341 B1 | 6/2019 |
| RU | 2141238 | 11/1999 |
| WO | 9510959 | 4/1995 |
| WO | 9838889 | 9/1998 |
| WO | 9844823 A2 | 10/1998 |
| WO | 2005002826 A1 | 1/2005 |
| WO | 2005030002 | 4/2005 |
| WO | 200641658 | 4/2006 |
| WO | 2008052210 A2 | 5/2008 |
| WO | 2008052250 A1 | 5/2008 |
| WO | 2008098107 A2 | 8/2008 |
| WO | 2009045982 A1 | 4/2009 |
| WO | 2011075133 A1 | 6/2011 |
| WO | 2012126126 | 9/2012 |
| WO | 2012144328 | 10/2012 |
| WO | 2013076904 | 5/2013 |
| WO | 2013101300 A1 | 7/2013 |
| WO | 2013158741 | 10/2013 |
| WO | 2013172834 A1 | 11/2013 |
| WO | 2014193621 | 12/2014 |
| WO | 2014197293 A1 | 12/2014 |
| WO | 2015061651 A1 | 4/2015 |
| WO | 2016189407 A1 | 12/2016 |
| WO | 2017139256 A1 | 8/2017 |
| WO | 2017155033 A1 | 9/2017 |
| WO | 2017173768 A1 | 10/2017 |
| WO | 2018025751 | 2/2018 |
| WO | 2019072925 A1 | 4/2019 |
| WO | 2019157787 A1 | 8/2019 |
| WO | 2021207751 A1 | 10/2021 |

OTHER PUBLICATIONS

All Office Actions; U.S. Appl. No. 17/517,928, filed Nov. 3, 2021.
All Office Actions; U.S. Appl. No. 17/517,937, filed Nov. 3, 2021.
All Office Actions; U.S. Appl. No. 17/517,957, filed Nov. 3, 2021.
All Office Actions; U.S. Appl. No. 17/517,975, filed Nov. 3, 2021.
All Office Actions; U.S. Appl. No. 17/517,990, filed Nov. 3, 2021.
All Office Actions; U.S. Appl. No. 17/517,999, filed Nov. 3, 2021.
All Office Actions; U.S. Appl. No. 17/518,009, filed Nov. 3, 2021.
Unpublished U.S. Appl. No. 17/511,103, filed Oct. 26, 2021, to first inventor et. al.
Unpublished U.S. Appl. No. 17/517,928, filed Nov. 3, 2021, to first inventor et. al.
Unpublished U.S. Appl. No. 17/517,937, filed Nov. 3, 2021, to first inventor et. al.
Unpublished U.S. Appl. No. 17/517,957, filed Nov. 3, 2021, to first inventor et. al.
Unpublished U.S. Appl. No. 17/517,975, filed Nov. 3, 2021, to first inventor et. al.
Unpublished U.S. Appl. No. 17/517,990, filed Nov. 3, 2021, to first inventor et. al.
Unpublished U.S. Appl. No. 17/517,999, filed Nov. 3, 2021, to first inventor et. al.
Unpublished U.S. Appl. No. 17/518,009, filed Nov. 3, 2021, to first inventor et. al.
All Office Actions; U.S. Appl. No. 17/155,167, filed Jan. 22, 2021.
All Office Actions; U.S. Appl. No. 17/462,089, filed Aug. 31, 2021.

(56) References Cited

OTHER PUBLICATIONS

Unpublished U.S. Appl. No. 17/462,089, filed Oct. 31, 2021, to first inventor et. al.
U.S. Appl. No. 29/762,793, filed Dec. 18, 2020, Uwe Jungnickel et al.
U.S. Appl. No. 29/787,712, filed Jun. 8, 2021, Uwe Jungnickel et al.
U.S. Appl. No. 29/699,695, filed Jul. 29, 2019, Niclas Altmann et al.
U.S. Appl. No. 29/743,560, filed Jul. 22, 2020, Devran Albay et al.
U.S. Appl. No. 29/758,268, filed Nov. 13, 2020, Devran Albay et al.
U.S. Appl. No. 29/758,249, filed Nov. 13, 2020, Devran Albay et al.
U.S. Appl. No. 29/758,251, filed Nov. 13, 2020, Devran Albay et al.
U.S. Appl. No. 29/758,276, filed Nov. 13, 2020, Devran Albay et al.
U.S. Appl. No. 29/758,274, filed Nov. 13, 2020, Devran Albay et al.
U.S. Appl. No. 29/786,732, filed Jun. 2, 2021, Devran Albay et al.
U.S. Appl. No. 29/786,746, filed Jun. 2, 2021, Devran Albay et al.
U.S. Appl. No. 29/782,323, filed May 6, 2021, Christine Hallein et al.
U.S. Appl. No. 29/746,709, filed Aug. 17, 2020, Christine Hallein et al.
U.S. Appl. No. 29/659,068, filed Aug. 6, 2020, Christine Hallein et al.
U.S. Appl. No. 29/787,707, filed Jun. 8, 2021, Uwe Jungnickel et al.
U.S. Appl. No. 29/746,718, filed Aug. 17, 2020, Dominik Langhammer.
U.S. Appl. No. 29/681,302, filed Feb. 25, 2019, Christine Hallein et al.
U.S. Appl. No. 29/757,497, filed Nov. 6, 2020, Christine Hallein et al.
U.S. Appl. No. 29/755,910, filed Oct. 23, 2020, Christine Hallein et al.
U.S. Appl. No. 29/757,499, filed Nov. 6, 2020, Christine Hallein et al.
U.S. Appl. No. 29/761,083, filed Dec. 7, 2020, Christine Hallein et al.
U.S. Appl. No. 29/761,085, filed Dec. 7, 2020, Christine Hallein et al.
U.S. Appl. No. 29/761,086, filed Dec. 7, 2020, Christine Hallein et al.
U.S. Appl. No. 29/761,090, filed Dec. 7, 2020, Christine Hallein et al.
U.S. Appl. No. 29/752,903, filed Sep. 29, 2020, Uwe Jungnickel et al.
U.S. Appl. No. 29/752,912, filed Sep. 29, 2020, Uwe Jungnickel et al.
All Office Actions, U.S. Appl. No. 16/551,307.
All Office Actions, U.S. Appl. No. 16/551,399.
All Office Actions, U.S. Appl. No. 16/829,585.
All Office Actions, U.S. Appl. No. 17/077,639.
All Office Actions, U.S. Appl. No. 17/090,980.
All Office Actions, U.S. Appl. No. 17/155,208.
All Office Actions, U.S. Appl. No. 17/218,573.
All Office Actions, U.S. Appl. No. 17/218,742.
All Office Actions, U.S. Appl. No. 17/219,989.
All Office Actions, U.S. Appl. No. 17/225,259.
All Office Actions, U.S. Appl. No. 17/225,283.
All Office Actions, U.S. Appl. No. 17/225,296.
All Office Actions, U.S. Appl. No. 17/225,411.
All Office Actions, U.S. Appl. No. 16/272,392.
All Office Actions, U.S. Appl. No. 16/272,422.
All Office Actions, U.S. Appl. No. 16/272,872.
All Office Actions, U.S. Appl. No. 16/272,943.
All Office Actions; U.S. Appl. No. 16/225,592.
All Office Actions; U.S. Appl. No. 16/225,688.
All Office Actions; U.S. Appl. No. 16/225,809.
All Office Actions; U.S. Appl. No. 16/225,509.
Extended European Search Report and Search Opinion; Application Ser. No. 18156000.4; dated Jul. 20, 2018, 8 pages.
International Search Report and Written Opinion; Application Ser. No. PCT/US2019/016215; dated May 24, 2019, 10 pages.
Unpublished U.S. Appl. No. 17/155,208, filed Jan. 22, 2021, to first inventor et. al.
Unpublished U.S. Appl. No. 17/218,573, filed Mar. 31, 2021, to first inventor et. al.
Unpublished U.S. Appl. No. 17/218,742, filed Mar. 31, 2021, to first inventor et. al.
Unpublished U.S. Appl. No. 17/219,989, filed Apr. 1, 2021, to first inventor et. al.
Unpublished U.S. Appl. No. 17/225,259, filed Apr. 8, 2021, to first inventor et. al.
Unpublished U.S. Appl. No. 17/225,283, filed Apr. 8, 2021, to first inventor et. al.
Unpublished U.S. Appl. No. 17/225,296, filed Apr. 8, 2021, to first inventor et. al.
Unpublished U.S. Appl. No. 17/225,411, filed Apr. 8, 2021, to first inventor et. al.
CAEtool, Density of Materials, Retrieved from Internet: https://caetool.com/2017/10/12/p0016/, Dec. 12, 2022, 3 pages.
All Office Actions; U.S. Appl. No. 18/100,730, filed Jan. 24, 2023.
Unpublished U.S. Appl. No. 18/100,730, filed Jan. 24, 2023 to Gerald Görich et al.
All Office Actions; U.S. Appl. No. 18/524,201, filed Nov. 30, 2023.
Erik Gregersen, "Compounds", Britannica, Iron—Compounds, Allotropes, Reactions, Retrieved from Internet: https://www.britannica.com/science/iron-chemicalelement/Compounds#/ref93312, Year 2007, 3 pages.
Jaime Aparecido Cury et al., "The Importance of Fluoride Dentifrices to the Current Dental Caries Prevalence in Brazil". Faculty of Dentistry of Piracicaba, Nov. 24, 2004, pp. 167-174.
Unpublished U.S. Appl. No. 18/524,201, filed Nov. 30, 2023 to Uwe Jungnickel et al.
"The Proven Material for Metal Replacement", Grivory GV, Provided by EMS-Grivory, year 2014, 36 pages.
"Spring Plungers push fit stainless steel", KIPP, Aug. 9, 2015, 1 page.
"Steel and Stainless Steel Press Fit Ball Plunger with Stainless Ball", Northwestern Tools, Mar. 12, 2016, 1 page.
All Office Actions; U.S. Appl. No. 18/361,100, filed Jul. 28, 2023.
Unpublished U.S. Appl. No. 18/361,100, filed Jul. 28, 2023 to Uwe Jungnickel et al.
Density of Plastic Materials, Online retrieved from "https://omnexus.specialchem.com/polymer-property/density", 2024, 12 Pages.

* cited by examiner

MANUAL TOOTHBRUSH HAVING REPLACEABLE HEAD

FIELD OF THE INVENTION

The present disclosure is concerned with a manual toothbrush comprising a handle, a replaceable head, and a connector, the head being repeatedly attachable to and detachable from the handle via the connector.

BACKGROUND OF THE INVENTION

Heads and handles for oral-care implements, such as manual toothbrushes, are well known in the art. Generally, tufts of bristles or other cleaning elements for cleaning teeth and soft tissue in the mouth are attached to a bristle carrier or mounting surface of the brush head intended for insertion into a user's oral cavity. The handle is usually attached to the head, which handle is held by a user during brushing. Usually, heads of manual toothbrushes are permanently connected to the handle, e.g., by injection molding the bristle carrier, the handle, a neck connecting the head and the handle, in one injection molding step. After the usual lifetime of a toothbrush, i.e., after about three months of usage, the toothbrush is discarded. In order to provide environmentally friendly/sustainable manual toothbrushes generating less waste when the brushes are discarded, manual toothbrushes are known comprising heads or head refills being exchangeable, i.e., repeatedly attachable to and detachable from the handle. Instead of buying a completely new toothbrush, consumers can re-use the handle and buy a new head refill only. Such refills are usually less expensive and generate less waste than a conventional manual toothbrush.

For example, manual toothbrushes are known comprising a handle to which a replaceable head is connected. The handle is provided with a cavity within which the head is insertable. To provide sufficiently strong connection between the head and the handle, the brush head is formed with a neck having a coupling anchor with a number of recesses for engaging in a complementary engaging mechanism within a collar of the handle.

However, such anchor/engaging mechanism has a relatively complex outer geometry which is not easy to clean after usage of the toothbrush. Toothpaste and slurry may accumulate in recesses of the anchor/engaging mechanism and may prevent the brush head to be accurately attachable to the handle. No guidance element is provided facilitating correct and precise adjustment of the head on the handle, in particular if recesses are blocked by accumulated slurry. Further, such engaging mechanism does not provide the toothbrush with sufficient anti-twist protection for the brush head on the handle during brushing.

If the head is not accurately attached/fixed on the handle, for example because the connector is not sufficiently clean as slurry and toothpaste accumulated in small recesses, and/or if the brush head twists away during brushing, the maneuverability of the toothbrush during brushing is poor, impeding the user reaching all areas in the oral cavity. Consequently, maneuverability of the overall brush may not be sufficient. However, in order to achieve and preserve good oral health, and to prevent gingivitis, it is important to clean teeth and gums thoroughly, in particular in hard to reach areas, e. g. in the region of the back molars. Further, gaps between teeth and periodontium, the so called gingival groove has to be thoroughly cleaned which requires a good and well-coordinated brushing technique, which may not be achievable by using the above-mentioned manual toothbrushes.

It is an object of the present disclosure to provide a manual toothbrush which overcomes at least one of the above-mentioned drawbacks, in particular a toothbrush which comprises an exchangeable brush head which is easily connectable to a handle and which does not rotate/twist aside during brushing.

SUMMARY OF THE INVENTION

In accordance with one aspect, a manual toothbrush, including a disposable head comprising a thermoplastic material and a reusable handle comprising an aluminum material, has a center of gravity, a longitudinal axis, and mutually opposite front and back sides. The handle has a proximal end, which is adjacent to the head when the head is attached to the handle, and a distal end opposite thereto. The center of gravity lies within the handle even when the brush head is loaded with toothpaste, wherein the center of gravity is arranged at or in close proximity to the pivot point of a wrist joint of a user brushing teeth, which arrangement facilitates precise and accurate brushing movements by the user. The handle's proximal end terminates with a chamfered surface, wherein the chamfered surface and a cross-sectional area perpendicular to the axis form therebetween an angle α from about 15° to about 30° such that one of the front side and the back side of the handle is shorter than the other.

DETAILED DESCRIPTION OF THE INVENTION

Figure 1:
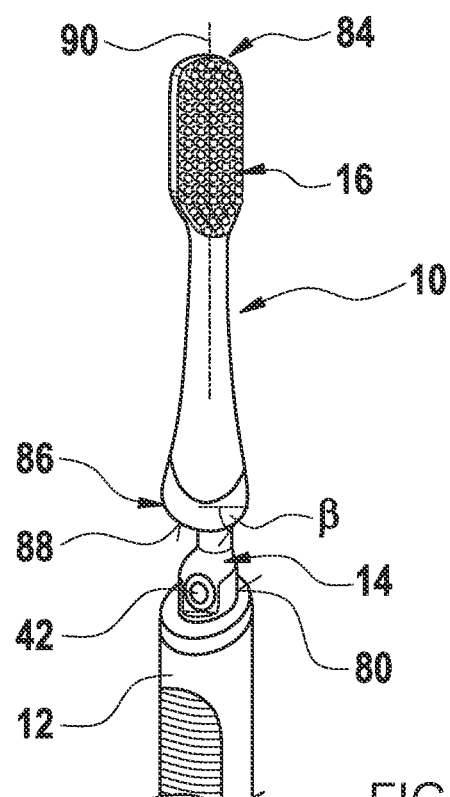
FIG. 1 shows a perspective view of an example embodiment of a manual toothbrush according to the present disclosure, the toothbrush comprising a head, a handle and a connector.
Figure 2:
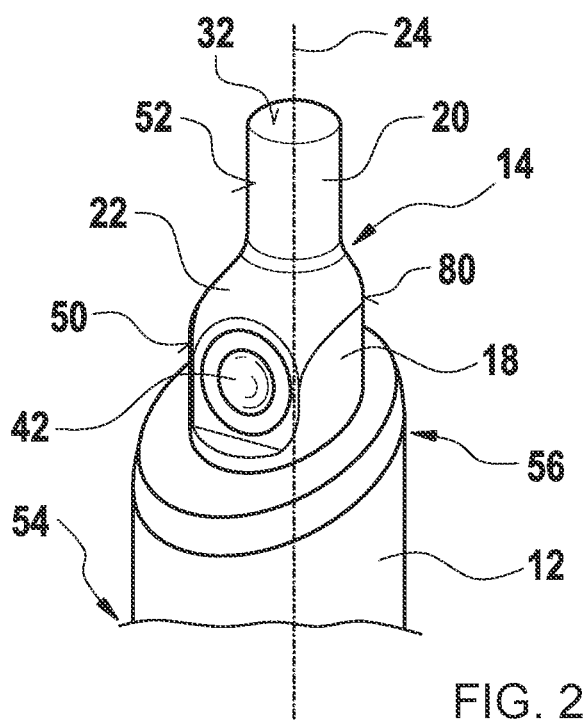
FIG. 2 shows a perspective view of the handle with connector of FIG. 1.
Figure 3:
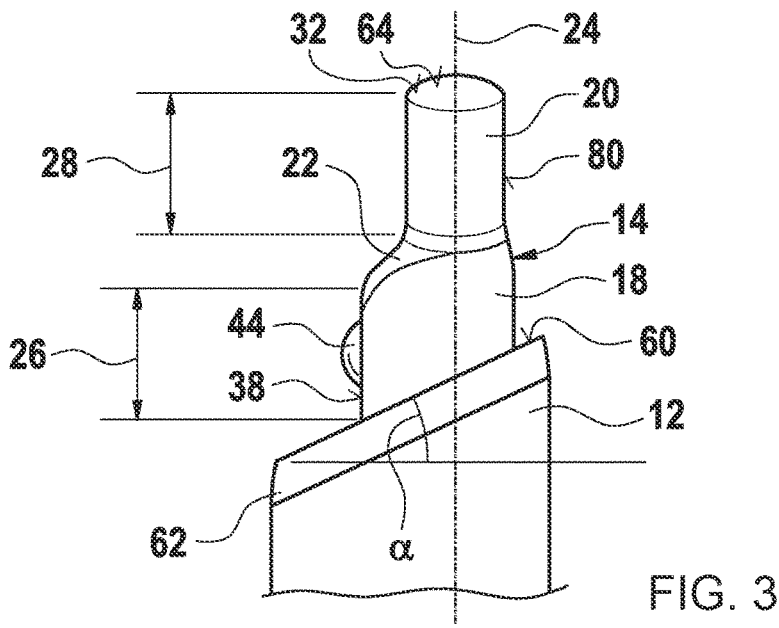
FIG. 3 shows a schematic side view of the handle with connector according to FIG. 2.
Figure 4:
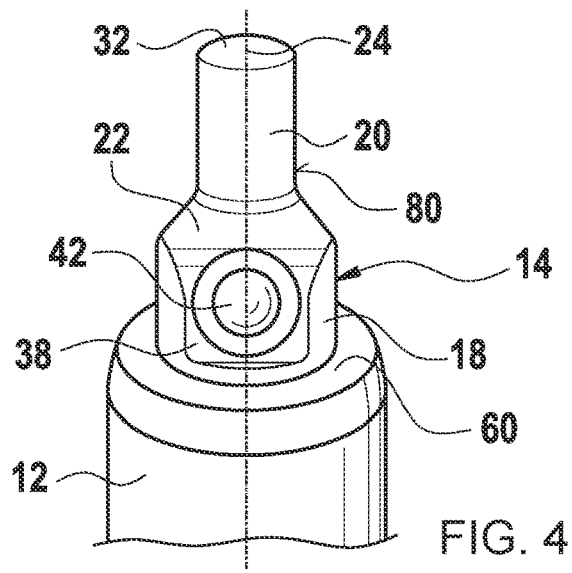
FIG. 4 shows a schematic front view of the handle with connector according to FIG. 2.
Figure 5:
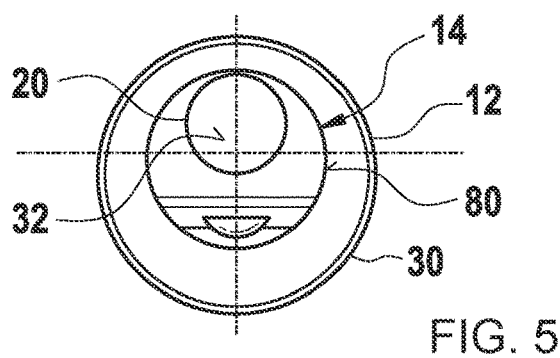
FIG. 5 shows a schematic top-down view of the handle with connector according to FIG. 2.

The manual toothbrush according to the present disclosure comprises a handle and a head on which at least one tooth and/or tissues cleaning element, e.g., a tuft of bristles and/or an elastomeric element, is fixed. The head is repeatedly attachable to and detachable from the handle via a connector.

The handle has a front surface and a back surface opposite to the front surface, and a distal end and a proximal end opposite to the distal end. The proximal end is closest to the head when the head is attached to the handle. The proximal end of the handle may comprise a hollow portion/recess into which a part of the connector is fixed, e.g., by a press-fitting process and/or gluing. If the connector forms a part of the handle, the connector—representing a relatively expensive part of the overall toothbrush—can be used over an extended/longer period of time. The head having a relatively simple structure and being relatively cheap as compared to the handle comprising the connector, can be replaced every three months. A new head refill can be purchased at relatively low costs. While replaceable brush heads according to the state of the art include an assembly of multiple parts or comprise at least one additional insert, the frequently exchangeable brush heads for the toothbrush according to the present disclosure can be produced at lower costs.

The proximal end of the handle comprises a chamfered surface; consequently one of the front side and the back side of the handle is shorter than the other. Such chamfered surface provides the toothbrush with anti-twist protection during use. The chamfered surface and a cross-sectional area of the handle may define an angle α from about 15° to about 30°, or from about 18° to about 28°, or about 25°. Said cross-sectional area is defined by an area extending substantially perpendicular to the longitudinal length extension of the handle. Surprisingly, it has been found out that such angled/chamfered surface provides superior anti-twist protection. Furthermore, the angled/chamfered surface allows for draining-off fluids, like toothpaste slurry and saliva, after use of the toothbrush, thereby preventing accumulation of such fluids over time. The overall toothbrush can be kept clean over an extended period of time which renders the implement more hygienic.

Corresponding to the handle, the head has a distal end and a proximal end, the proximal end being opposite the distal end and closest to the handle when the head is attached thereto. The proximal end may have an upper surface which is chamfered, as well. The chamfered upper surface and the cross-sectional area of the head which is substantially perpendicular to the longitudinal axis of the head may define an angle β from about 15° to about 30°, or from about 18° to about 28°, or about 25°. Such configuration may allow for precise adjusting and fitting of the head to the handle. The user can attach the head to the handle by a simple linear motion. With the chamfered surface of the handle and the corresponding chamfered surface of the head, the head is turned into the right orientation automatically during the attachment motion.

The head of the toothbrush is attachable to the handle via a connector which may provide a snap-fit locking mechanism to ensure sufficiently strong connection and stability between the head and the handle, e.g., to enable a user to perform a brushing action. The connector may have an outer lateral surface and a recess therein, the recess forming a cavity within the connector. Within the cavity a spring-loaded ball-snap element may be provided. The spring-loaded ball-snap element may comprise a ball and a spring, and the spring may apply a radial force onto the ball in a direction towards the outer lateral surface of the connector. In the following a radial force is defined by a force applied in a direction being substantially perpendicular to the longitudinal length extension of the connector. The spring may apply a force onto the ball and pushes the ball outwards so that the ball extends slightly beyond the outer lateral surface of the connector. An inner wall of a hollow portion provided in the head may comprise a recess for receiving the ball of the spring-loaded ball element. Once the head is snap-fitted onto the connector, the head is fixed on the handle/connector in an axial direction. In other words, the connector and the toothbrush comprising such connector, respectively, allow for easy attachment/detachment of the head to and from the handle. The user can attach the brush head to the handle by a simple linear motion. Further, the ball-snap may provide a precise fixation of the brush head, and a distinct haptic feedback may be given to the user that the head is snapped-on securely. In other words, the user may recognize once the ball engages into the recess provided in the inner wall of the hollow portion of the head. The brush head can be easily removed, i.e., without performing a synchronized action with other elements/unlocking mechanisms.

The head may be fixed on the handle until a specific/predetermined pull-off force is applied. The connection between the head and connector is sufficiently strong enabling well-coordinated brushing techniques. The head may not get loosened from the handle and may not twist aside during brushing.

The ball and/or the spring of the spring-loaded ball element may be made from stainless steel. While typical snap elements comprise a spring element made from plastic material that shows relaxation and aging effects over time, a stainless steel spring shows a constant spring rate over time, also under extended use conditions (e.g., temperature). A spring-loaded ball element made from stainless steel may provide long-lasting, reliable fixation of the head on the connector/handle. Moreover, if the spring-loaded ball snap element is made completely from stainless steel, an electrical contact from the handle to the refill can be easily realized. In order to provide a closed electric circuit, an electrically conductive ring at the proximal end of the handle can be attached as a second contact. An electrical contact from the handle to the refill allows for various additional functions, e.g., light for diagnostics or treatment, e.g., for iontophoresis. The spring-loaded ball element may be fixed in the cavity by a press-fitting process and/or gluing. The connector may comprise a first substantially cylindrical section and a second substantially cylindrical section, wherein the first and the second cylindrical sections may be connected by an at least partially conically shaped section. The first substantially cylindrical section, the at least partially conically shaped section and the second substantially cylindrical section may be arranged in consecutive order and may define a longitudinal length extension of the connector. The first and the second substantially cylindrical sections may be placed off-center with respect to the longitudinal length extension of the connector.

In the following, a substantially cylindrical section is defined by a three-dimensional body having a longitudinal length extension and a cross-sectional area extending substantially perpendicular to the longitudinal length extension. The cross-sectional area has a shape being substantially constant along the longitudinal length extension. Since the connector may be manufactured by an injection molding process, a substantially cylindrical section also comprises sections/bodies which have a slight draft angle of up to 2°. In other words, a substantially cylindrical section also comprises a section/body which tapers slightly by up to 2° towards a proximal end which is closest to the head once the head is attached to the connector.

The cross-sectional area may have any shape, for example substantially circular, ellipsoid, rectangular, semi-circular, circular with a flattening portion, convex or concave. The cross-sectional area may have the shape of a polygon, for example of a square or triangle. The outer lateral surface circumventing the cylinder along its length extension can be defined as being composed of straight lines which are substantially parallel with respect to the longitudinal length extension of the cylinder.

The proximal end of the head may comprise a hollow portion for receiving a part of the connector, for example, the second substantially cylindrical section, the at least partially conically shaped section and a part of the first substantially cylindrical section. The hollow portion of the head may have an inner wall with a geometry/contour which corresponds to the outer geometry/contour of the part of the connector to be inserted into the hollow portion of the head. The eccentric arrangement/off-center positioning of the substantially cylindrical sections of the connector may enable precise positioning of the brush head on the handle. The geometric position of the head can be clearly defined. As the handle comprises the connector at a proximal end being closest to the head, the eccentric/off-center arrangement of the two substantially cylindrical sections may act as a further guidance element when a user attaches the head to the handle. In other words, the two substantially cylindrical sections may allow for even better accurate fitting between the head and the handle. Further, the eccentric/off-center arrangement of the two substantially cylindrical sections may provide for further anti-twist protection for the head on the handle during brushing, for example if a lateral force is applied onto the head.

The first substantially cylindrical section and the second substantially cylindrical section have a length extension and a cross-sectional area extending substantially perpendicular to the length extension, and the cross-sectional area of the first substantially cylindrical section and/or second of the second substantially cylindrical section may be substantially circular. Such geometry provides a robust and simple structure which is easy to clean after usage of the toothbrush. Further, since the outer geometry is relatively simple, such connector can be manufactured in a cost-efficient manner.

The first substantially cylindrical section may have a cross-sectional area being greater than the cross-sectional area of the second substantially cylindrical section. For example, the first substantially cylindrical section to be inserted into a hollow portion at the proximal end of the handle, may have a substantially circular cross-sectional area with a diameter of about 8 mm to about 10 mm, preferably about 9 mm, while the second substantially cylindrical section to be inserted into a hollow portion at the proximal end of the head, may have a substantially circular cross-sectional area with a diameter of about 4 mm to about 6 mm, preferably about 5 mm.

The first and the second substantially cylindrical sections may have a first and a second longitudinal central axis, respectively which are defined as the symmetry axis of the first and the second substantially cylindrical sections. The first and the second substantially cylindrical sections may be placed/arranged with respect to each other so that the second longitudinal central axis of the second cylindrical section is located off-center with respect to the first longitudinal central axis of the first cylindrical section by about 1 mm to about 2.5 mm, or by about 1.5 mm to about 2 mm, or by about 1.65 mm. In other words, the center of the second substantially cylindrical section is offset/eccentric from the longitudinal central axis of the first substantially cylindrical section by a distance of about 1 mm to about 2.5 mm, or of about 1.5 mm to about 2 mm, or of about 1.65 mm.

Such connector may be easy to manufacture, e.g., by injection molding, and provides sufficient torsional stability for the toothbrush if lateral forces are applied onto the brush head.

The first and/or the second substantially cylindrical section may comprise a flattening portion extending along the length extension of the first and/or second substantially cylindrical section. Such flattening portion may provide the toothbrush with additional anti-twist protection for the head being connected to the handle during brushing, for example if a lateral force is applied onto the head.

The first and the second substantially cylindrical sections have a first and a second outer surface, respectively, and the first and the second substantially cylindrical sections may be arranged with respect to each other so that a part of the first outer surface and a part the second outer surfaces are substantially in straight alignment. The flattening portion, optionally comprising the spring-loaded ball element, may be arranged opposite the first and second outer surfaces being substantially in straight alignment. Such connector has an easy to clean outer geometry. The connector is robust, easy to use, and can be manufactured in a cost-efficient manner.

The toothbrush according to the present disclosure allows for easy attachment/detachment of the head to and from the handle. The user can attach the head to the handle by a simple linear motion. With the chamfered surface of the handle, and the specific design of the substantially cylindrical sections being arranged off-center, the head is turned into the right orientation automatically during the attachment motion (within certain tolerances). Therefore, the consumer is not forced to precisely position the head on the handle before snapping it on. Further, the ball-snap provides a precise fixation of the brush head, and a distinct haptic feedback may be given to the user that the head is snapped-on securely. The head can be easily removed, without any synchronized action with other elements or unlocking mechanisms. In addition, the connector can be cleaned easily. The specific design of the connector may not have any recesses in which dirt, toothpaste and/or saliva accumulate. The connector may also avoid any fragile structures by comprising substantially round edges, only, which may prevent easy breakage or damage of the surfaces.

To allow sufficiently good fitting of the brush head on the connector if production tolerances occur, the inner wall of the hollow portion of the head may comprise at least one rib, or two ribs being arranged opposite each other, for precisely adjusting the head on the connector/handle. Furthermore, the at least one rib may prevent compression of air in the hollow portion of the head which could act like a spring or as additional resistance while snapping the head on the connector/handle.

At least a portion of the head, e. g. the neck/shaft and the bristle carrier may be at least partially made from a material having a density from about 0.5 $g/cm^3$ to about 1.2 $g/cm^3$, or from about 0.7 $g/cm^3$ to about 1.0 $g/cm^3$, or about 0.9 $g/cm^3$. For example, the head may be injection molded from a thermoplastic polymer, e.g., polypropylene having a density of about 0.9 $g/cm^3$. In contrast to the head, the handle may be at least partially made from a material having a significant higher density, i.e., a density from about 2.1 $g/cm^3$ to about 3.1 $g/cm^3$, or from about 2.3 $g/cm^3$ to about 2.8 $g/cm^3$, or from about 2.5 $g/cm^3$ to about 2.7 $g/cm^3$.

The weight of the handle material may be relatively high, to provide a user with high-quality perception and comfortable feeling during use of the toothbrush. Usually users are accustomed that products, in particular in the personal health care sector, have a specific weight that guarantees high product quality and provides comfortable feeling during use of the product. Consequently, such toothbrush provides such superior product quality perception.

Further, since the material of the handle may have a higher density than the material of the head, the center of mass/center of gravity lies within the handle (even if the brush head is loaded with toothpaste) which enables users to perform a well-coordinated brushing technique with improved sensory feeling during brushing. The center of gravity provided in the center of the handle may provide a toothbrush which is better balanced and does not tip over/does not get head loaded once toothpaste is applied onto the brush head. When users apply different grip styles/brushing techniques, the toothbrush according to the present disclosure has the advantage that the center of gravity is in or very close to the pivot point of the wrist joint. A balanced toothbrush is easier to control in the mouth, thereby allowing more precise and accurate brushing movements which enables better cleaning.

While the high quality and relatively expensive handle of the toothbrush may be adapted for use over a longer period of time as compared to common manual toothbrushes which are discarded after about three months of use, the relatively cheap brush refill can be exchanged on a regular basis, e.g., after about three months. This provides a cost-efficient and environmentally sustainable high quality toothbrush with improved handling properties.

In the past, it has been seen that after use of the brush/after brushing the teeth the user usually stores the wet brush in a toothbrush beaker for drying. However, in a classical toothbrush beaker, drained fluids get collected and accumulated at the bottom of the beaker, and, the fluids stay in contact with the toothbrush for a longer period of time. Since the beaker is open on one side only, the toothbrush dries relatively slowly. Bacteria living in wet conditions/in a wet environment can grow quickly, contaminate the toothbrush and finally render the brush unhygienic. Consequently, there exists a need for a solution for hygienically storing and drying a manual toothbrush, thereby enabling remaining water, toothpaste slurry and saliva to drain off from the brush. The brush shall dry quickly thereby inhibiting bacterial growth.

The material of the head may be made of a non-magnetic or non-ferromagnetic material, while the material of the handle may be made from a magnetic and/or ferromagnetic material. Magnetic/ferromagnetic material possesses not only a relatively high density, and, thus, a relatively heavy weight, which may provide the toothbrush with the above-mentioned benefits, but the magnetic/ferromagnetic material also enables the toothbrush to be magnetically attachable to a magnetic holder. The magnetic/ferromagnetic material of the handle may allow for hygienic storage of the toothbrush. If the toothbrush is magnetically attached to a magnetic holder, remaining water, toothpaste slurry and saliva can drain off from the brush. The toothbrush can dry relatively quickly. Consequently, bacteria growth can significantly be reduced, thereby rendering the toothbrush more hygienic. In contrast to a common toothbrush being stored in a toothbrush beaker where drained fluids get collected and accumulated at the bottom of the beaker, the brush according to the present disclosure is exposed to wet conditions over a significantly shorter period of time.

For example, the magnetic holder may have the form of a flat disk attachable to a wall. Such flat disk may represent an easy to clean surface. Further, a user just needs to bring the toothbrush in close proximity to the magnetic holder, and then the toothbrush gets attached automatically. No precise positioning or threading as in common toothbrush holder is required. Since the magnetic properties are merely provided in the handle, and not in the head, the head portion cannot accidentally be attached to the magnetic holder, thereby reducing the risk that the magnetic holder gets soiled.

The magnetic and/or ferromagnetic material forming at least a part of the handle may comprise an amorphous thermoplastic resin. The magnetic and/or ferromagnetic material may further comprise aluminum oxide, boron nitride or aluminum silicate. Furthermore, the magnetic and/or ferromagnetic material may comprise in addition or alternatively iron oxide. The magnetic and/or ferromagnetic material may further comprise glass fibers which may be pre-mixed with at least a portion of the amorphous thermoplastic resin. Such handle material allows for control of the weight of the handle in whatever location, e.g., by filler variation. Control of the overall toothbrush is required due to the relatively high weight of the handle. It is now possible to use the mass/weight distribution of the material for adaption of the inertial moment of the finished toothbrush.

The magnetic and/or ferromagnetic material may comprise from about 13 weight percent to about 30 weight percent of an amorphous thermoplastic resin; from about 3 weight percent to about 25 weight percent of aluminum oxide, boron nitride or aluminum silicate; and from about 45 weight percent to about 67 weight percent of iron oxide. Such composition provides a material density that is about three times the density of a standard plastic material used for toothbrushes, e.g., polypropylene. With higher weight and higher thermal conductivity, the material drives value perception, in particular in combination with a galvanic coating. Such coating may be made from real metal. The galvanic coating can be applied in a selective electroplating process. During this coating process for a multicomponent plastic part, a metallic layer is only deposited on a hard material while a further over molded soft component may remain unaffected.

The magnetic and/or ferromagnetic material may comprise about 27.5 weight percent of an amorphous thermoplastic resin, about 17 weight percent of aluminum oxide, about 51 weight percent of iron oxide, and about 4.5% glass fiber.

The amorphous thermoplastic resin may comprise a styrene resin, e.g., styrene acrylonitrile "SAN". The amorphous thermoplastic resin may be selected from the list consisting of acrylonitrile butadiene styrene, polystyrene, and styrene acrylonitrile.

The amorphous thermoplastic resin may comprise about 17% weight percent styrene acrylonitrile, and 10.5 weight percent of a mixture comprising polybutylene terephthalate and polyethylene terephthalate.

Surprisingly, it has been found out that said composition provides a high gravity molding material appropriate for injection molding or extrusion molding. A high specific gravity molding material high in surface hardness, excellent in coating characteristics as well as excellent in thermal conductivity is provided.

The use of molding materials having a relatively high specific gravity is known. Such molding materials usually contain a polymeric resin and a high-density filler such as iron oxide. However, in such molding materials the amount of iron oxide which can be included is limited as the thermal conductivity properties of the molding material are relatively poor. Thus, on the one side, lower thermal conductivity leads to relatively longer cycle times during manufacturing to allow the molding material to cool after molding.

On the other side, if heavy polymeric materials are filled with high heat conductive additives such as metal powder or fibers, the addition of these materials leads to tight process windows in molding because of the immediate freezing when the molten material contacts the cold wall of the tool. This fast freezing leads to high injection speed and low flow length to wall thickness ratio at the produced part.

Now, it has been surprisingly found out that the molding material according to the present disclosure has a high specific gravity and optimally controlled thermal conductivity properties to reduce or expand the time needed for the molding material to cool during or after injection molding. Surprisingly, it has been found out that a relatively high percentage of iron oxide can be maintained in the molding material while improving on the thermal conductivity properties of the molding material. The addition of aluminum oxide, boron nitride or aluminum silicate provides the molding material with improved thermal conductivity as compared to materials containing a styrene resin and iron oxide only. This improved thermal conductivity may lead to lower cycle times as the molding material needs less time to cool after molding.

Another benefit of adding aluminum oxide, boron nitride or aluminum silicate to the material is the ability to increase the overall amount of iron oxide in the molding material as compared with materials comprising iron oxide and resins of the past. The improvements in the molding material properties come from the addition of relatively small amounts of aluminum oxide, boron nitride or aluminum silicate. A material composition comprising a relatively high percentage of iron oxide (magnetite), i.e., from about 45 weight percent to about 67 weight percent, preferably about 51 weight percent, provides good magnetic properties and a relatively heavy weight of the overall material.

Styrene acrylonitrile "SAN" provides high thermal resistance properties. The acrylonitrile units in the chain enable SAN to have a glass transition temperature greater than 100° C. The properties of SAN may allow for reduced cycle time due to relatively earlier and quicker transition temperature. Amorphous polymers are suitable for heavy resin compounds of the present disclosure due to the glass transition temperature Tg at which an amorphous polymer is transformed, in a reversible way, from a viscous or rubbery condition to a hard one. By injection molding of the heavy resin material of the present disclosure the temperature of the material melt is above the Tg region (viscous or rubbery condition). During cooling the compound attains the high Tg temperature early and reaches dimensional stability (glassy condition). Over-molding of the heavy resin material is possible as the material stays dimensional stable due to the high Tg of the material.

Polybutylene terephthalate (PBT) and/or polyethylene terephthalate (PET) provide the handle with high quality surface properties, including improved optical characteristics, and high impact strength. Once heated, a mixture of PBT and PET represent a high temperature-resistant melt having low viscosity and a high Melt Flow Index (MFI). Therefore, processability of the magnetic/ferromagnetic material during molding is improved.

It is known that heavy resin materials tend to show high shrinkage effects for products having thick walls/dimensions. However, it has been surprisingly found out that glass fibers added to the magnetic/ferromagnetic material provide the material composition with improved stability and low shrinkage effects.

The material according to the present disclosure is an alternative to metal/zinc-die-cast material. The material of the disclosure enables to offer an attractive solution with respect to the manufacturing process according to the present disclosure, price and environment. This alternative allows the handle to have the look and feel in the final state like a metal product. At the same time the material of the present disclosure should be easily processable by injection molding and should save on the assembly effort. For example, for the process of the present disclosure there are three basic steps required: (1) injection molding of the handle 12; (2) two-component injection molding of hard material and/or soft material, e.g., to form a thumb rest 16; and (3) electroplating of the handle, e.g., to form a metal layer in the form of a ring 18. In contrast, when using a zinc-die-cast material five steps are needed: (1) manufacturing of the zinc-die-casted main part; (2) deflashing of the main part; (3) electroplating the main part; (4) separately producing a soft material part; (5) and assembling the main part with the separately produced soft material part. A lubricant may be added to the material to improve the molding processing fluidity.

Table 1, below, shows the flowability and heat-transfer results of several different formulas/material compositions:

| Test-No. | 20% SAN 80% Iron oxide | 20% SAN 5% Aluminum oxide 75% Iron oxide | 15% SAN 10% Aluminum oxide 75% Iron oxide | 17% SAN 16% Aluminum oxide 67% Iron oxide |
|---|---|---|---|---|
| Specific weight [g/cm³] | 2.91 | 2.95 | 2.99 | 3.06 |
| 1 | 21 | 16 | 13 | 9 |
| 2 | 20 | 16 | 13 | 9 |
| 3 | 20 | 16 | 13 | 10 |
| 4 | 21 | 16 | 13 | 9 |
| 5 | 20 | 16 | 14 | 9 |
| 6 | 20 | 16 | 13 | 8 |
| 7 | 20 | 16 | 13 | 9 |
| 8 | 20 | 16 | 13 | 9 |
| 9 | 20 | 16 | 13 | 9 |
| 10 | 20 | 16 | 13 | 9 |
| Average (cm) | 20.2 | 16 | 13.1 | 9 |
| Content Al-Ox [%] | 0 | 5 | 10 | 16 |
| Heat-transfer rate [W/m * K] | 0.87 | 0.96 | 1.2 | 1.43 |
|  | 0.89 | 1.06 | 1.22 | 1.41 |
|  | 0.88 | 1.01 | 1.23 | 1.44 |
| Average Value [W/m * K] | 0.88 | 1.01 | 1.21666667 | 1.42666667 |

Figure 13:
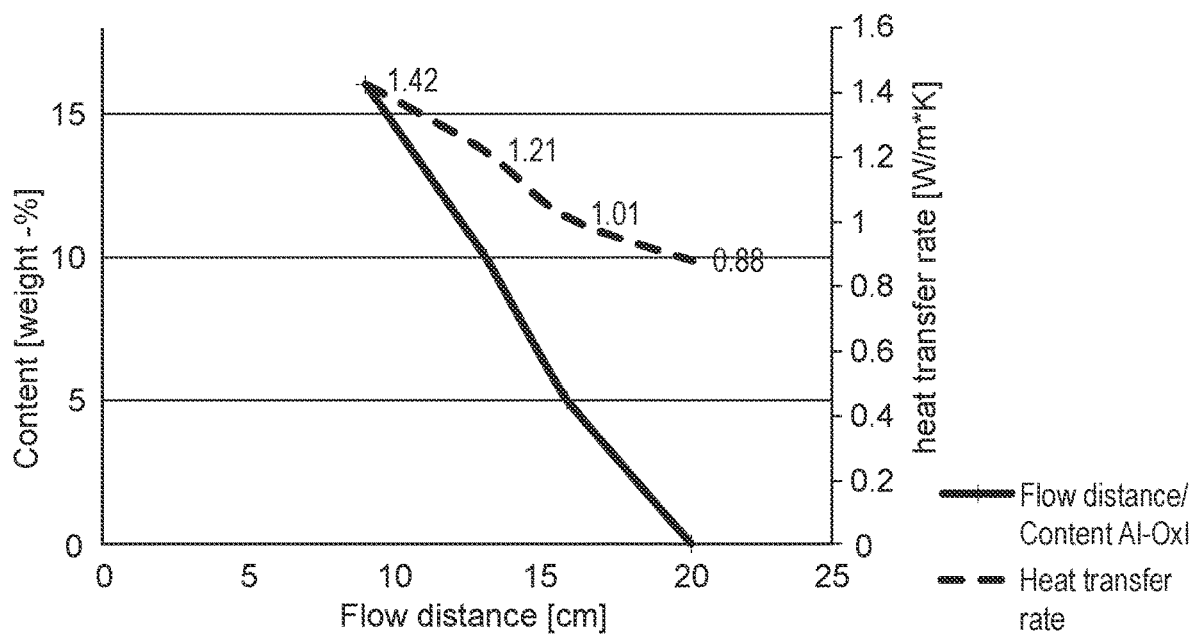
FIG. 13 is a graph showing average results of heat transfer and flow distance.

Graph 1, shown in FIG. 13, plots the average results of heat transfer and flow distance of the formulas/material compositions from Table 1. As can be seen, different fillers and different concentrations of fillers control the thermal conductivity or heat transmission and flowability of the material. Test results revealed that the use of boron nitride or aluminum silicate showed very similar results to that of aluminum oxide depicted in Table 1 and Graph 1 (FIG. 13).

The heat energy and shear heating affect the fluidity of the heavy resin material, and thereby the process window for an effective injection molding process can be exactly controlled. Further, with the ability of the material of the present disclosure to fill any available cavities within the mold, it is possible to use the mass/weight distribution of the material for adaption of the inertial moment of the finished handle.

There are several advantages related to the material of the present disclosure: The handle manufactured with the material of the present disclosure looks and feels like a heavy metal handle and it is resistant to corrosion. The material also has manufacturing advantages and cost saving advantages with fast cycle times due to its heat-transfer properties as compared to metal inserted or die-casted handles and products with assembled component parts. The material of the present disclosure requires less energy and other essential resources for manufacturing in comparison to zinc-die casted products.

In contrast to material compositions that are highly loaded with fillers, the magnetic/ferromagnetic material of the present disclosure shows optimized mechanical properties, in particular dimensional stability under heat and impact strength due to the improved melt viscosity and glass transition temperature.

The material of the present disclosure possesses the ability to adhere to other components/materials, e.g., substrates and resins, which is important for multicomponent injection molding, e.g., for molding handles comprising two or three different materials.

The handle or part of the handle may be electroplated to add improved appearance and a pleasant feel. Thermoplastic elastomers are well suited for electroplating as they allow for the creation of both, hard and soft composite components to be electroplated selectively in one operation.

For example, the handle may comprise a thumb rest being made from a thermoplastic elastomer material and/or from a polypropylene material. These materials can be easily injection molded over the heavy resin material as discussed above. Such thumb rest may provide the handle of the toothbrush with improved handling properties, e.g., with anti-slip properties to improve the maneuverability of the toothbrush under wet conditions, e.g., when the user brushes his teeth. The thumb rest may be made from thermoplastic elastomer having a Shore A hardness from about 30 to about 60, or about 40 to prevent the toothbrush from being too slippery when used in wet conditions. At least a portion of the thumb rest may have a concave shape with an angle α with respect to the area of the remaining portion of the thumb rest from about 20° to about 25°, or about 24°. The thumb rest or a gripping region may be attached onto the front surface of the handle in the region close to the proximal end, i.e., closest to the head. The thumb rest may comprise a plurality of ribs extending substantially perpendicular to the longitudinal axis of the toothbrush.

Such ribs may allow users/consumers to use the toothbrush with even more control. The user/consumer can better grasp and manipulate the handle of the toothbrush during brushing. Such handle may provide further improved control and greater comfort during brushing, in particular under wet conditions.

Furthermore, the handle may be made from at least two, or at least three different materials, each forming different parts of the handle. For example, a first material according to the present disclosure, e.g., a magnetic and/or ferromagnetic material may be injection molded into a first component of the handle thereby forming an underlying base structure of the toothbrush. A second component, e.g., of polypropylene material may be injection molded over the first component, and/or a third component, e.g., of thermoplastic elastomer material may be injection molded over the first component and/or the second component.

The third component of thermoplastic elastomer material may form the thumb rest on the front surface of the toothbrush and/or a palm grip on the back surface being opposite the front surface to be gripped by the user's/consumer's fingers and thumb. Such handle configuration may even further resist slippage during use. The thermoplastic elastomer material may extend through an aperture provided in the underlying base structure and/or second component of the handle.

The tooth cleaning elements of the toothbrush, e.g., bundle of filaments forming one or a plurality of tufts, may be attached to the head by means of a hot tufting process. One method of manufacturing the head with tufts of filaments embedded in the head may comprise the following steps: In a first step, tufts are formed by providing a desired number of filaments. In a second step, the tufts are placed into a mold cavity so that ends of the filaments which are supposed to be attached to the head extend into said cavity. The opposite ends of the filaments not extending into said cavity may be either end-rounded or non-end-rounded. For example, the filaments may be not end-rounded in case the filaments are tapered filaments having a pointed tip. In a third step the head is formed around the ends of the filaments extending into the mold cavity by an injection molding process, thereby anchoring the tufts in the head. Alternatively, the tufts may be anchored by forming a first part of the head—a so-called "sealplate"—around the ends of the filaments extending into the mold cavity by an injection molding process before the remaining part of the toothbrush is formed. Before starting the injection molding process the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished head of the toothbrush. In other words, the tufts attached to the head by means of a hot tufting process are not doubled over a middle portion along their length and are not mounted in the head by using an anchor/staple. The tufts are mounted on the head by means of an anchor-free tufting process.

Alternatively, the head for the toothbrush may be provided with a bristle carrier having at least one tuft hole, e.g., a blind-end bore. A tuft comprising a plurality of filaments may be fixed/anchored in said tuft hole by a stapling process/anchor tufting method. This means, that the filaments of the tuft are bent/folded around an anchor, e.g., an anchor wire or anchor plate, for example made of metal, in a substantially U-shaped manner. The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner Since the filaments of the tuft are bent around the anchor in a substantially U-shaped configuration, a first limb and a second limb of each filament extend from the bristle carrier in a filament direction. Filament types which can be used/are suitable for usage in a stapling process are also called "two-sided filaments". Heads for toothbrushes which are manufactured by a stapling process can be provided in a relatively low-cost and time-efficient manner.

The following is a non-limiting discussion of example embodiments of toothbrushes and parts thereof in accordance with the present disclosure, where reference to the Figures is made.

FIG. 1 shows a manual toothbrush 10, in this specific embodiment a manual toothbrush 10. The manual toothbrush 10 comprises a handle 12 to which a connector 14 is attached, and a brush head 16. The brush head 16 is repeatedly attachable to and detachable from the handle 12 via connector 14.

FIGS. 2 to 5 show a schematic perspective view, a side view, a front view and a top-down view of handle 12, respectively, handle 12 comprising connector 14. The connector 14 comprises a first substantially cylindrical section 18, a second substantially cylindrical section 20, and an at least partially conically shaped section 22 connecting the first and the second cylindrical sections 18, 20. The first substantially cylindrical section 18, the at least partially conically section 22 and the second substantially cylindrical sections 20 are arranged in consecutive order and define together a longitudinal length extension 24 of connector 14. The first substantially cylindrical section 18 and the second substantially cylindrical section 20 are placed off-center with respect to the longitudinal length extension 24 of the connector 14. As derivable from side view of FIG. 7, the first and the second substantially cylindrical sections 18, 20 have a first and a second longitudinal central axis 74, 76, respectively, which are defined as the symmetry axis of the first and the second substantially cylindrical sections 18, 20.

The first and the second substantially cylindrical sections 18, 20 may be placed/arranged with respect to each other so that the second longitudinal central axis 76 of the second cylindrical section 20 is located off-center with respect to the first longitudinal central axis 74 of the first cylindrical section 18 by a distance 78 of about 1 mm to about 2.5 mm, or of about 1.5 mm to about 2 mm, or of about 1.65 mm. In other words, when seen in a side view (cf. FIGS. 3, 7 and 8), the central axis 76 of the second substantially cylindrical section 20 is offset/eccentric from the longitudinal central axis 74 of the first substantially cylindrical section 18 by a distance 78 of about 1 mm to about 2.5 mm, or of about 1.5 mm to about 2 mm, or of about 1.65 mm.

Figure 8:
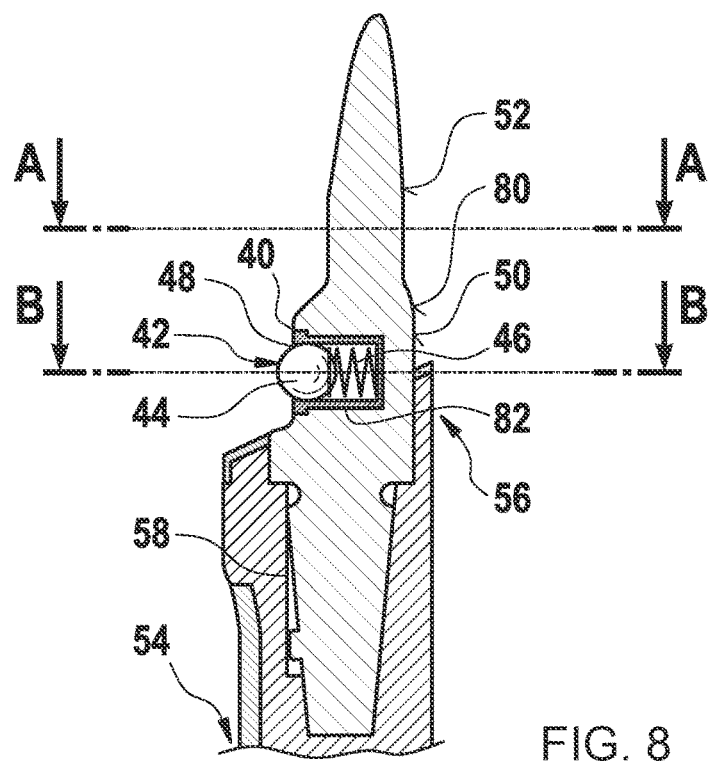
FIG. 8 shows a longitudinal cross-sectional view of the handle with connector of FIG. 2.
Figure 9:
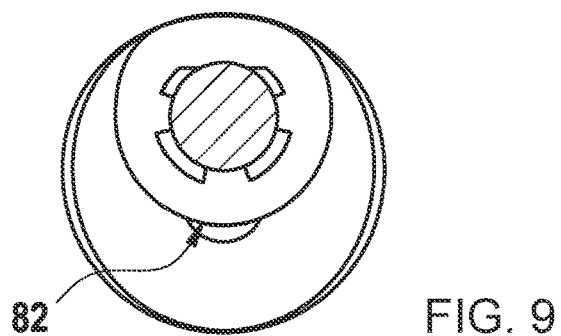
FIG. 9 shows the cross-sectional view along line A-A.
Figure 10:
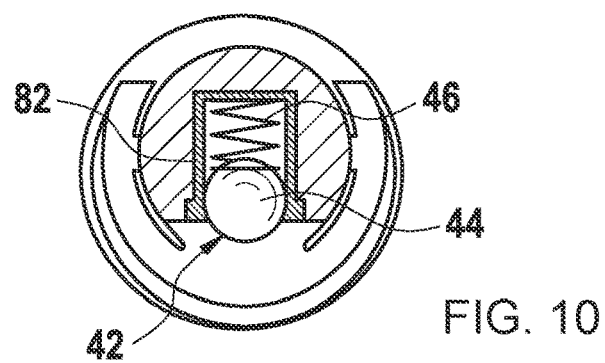
FIG. 10 shows the cross-sectional view along line B-B.

The handle 12 has a distal end 54 and a proximal end 56, the proximal end 56 being closest to a brush head 16 attachable to the handle 12. As shown in FIGS. 8 to 10, proximal end 56 of handle 12 comprising a hollow portion/recess 58 into which a portion of the first substantially cylindrical section 18 is fixed, e.g., by a press-fitting process and/or gluing.

The proximal end 56 of the handle 12 comprises a chamfered surface 60. The cross-sectional area 62 extending substantially perpendicular to the longitudinal length extension 64 and the chamfered surface 60 define an angle α from about 15° to about 30°, or from about 18° to about 28°, or about 25°. Corresponding to handle 12, the head 16 has a distal end 84 and a proximal end 86, the proximal end 86 being opposite the distal end 84 and closest to the handle 12 when the head is attached thereto. The proximal end 86 has an upper surface 88 which is chamfered, too. The chamfered upper surface 88 and the cross-sectional area 92 of head 16 being substantially perpendicular to the longitudinal axis 90 define an angle β from about 15° to about 30°, or from about 18° to about 28°, or about 25°.

Figure 6:
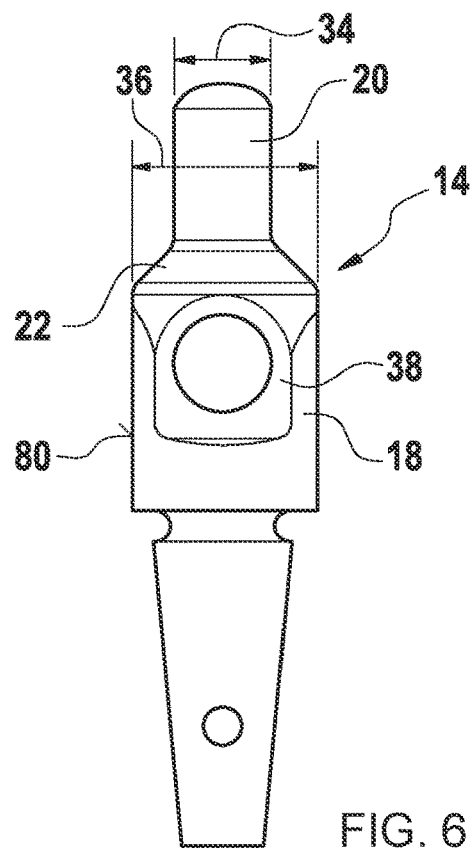
FIG. 6 shows a front view of an example embodiment of a connector according to the present disclosure.
Figure 7:
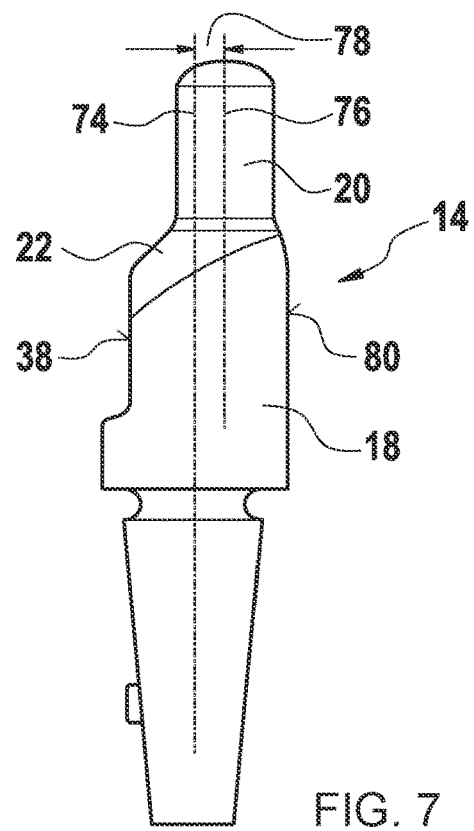
FIG. 7 shows a side view of the connector of FIG. 6.

FIGS. 6 and 7 show a schematic front and side view of connector 14, respectively. The first substantially cylindrical section 18 and the second substantially cylindrical section 20 have each a length extension 26, 28 and a cross-sectional area 30, 32 extending substantially perpendicular to the length extension 26, 28. The cross-sectional area 30 of the first substantially cylindrical section 18 and the second cross-sectional area 32 of the second substantially cylindrical section 20 is substantially circular. The first substantially cylindrical section 18 has a cross-sectional area 30 being greater than the cross-sectional area 32 of the second substantially cylindrical section 20. The first cross-sectional area 30 has a diameter 36 of about 8 mm to about 10 mm, or about 9 mm, while the second cross-sectional area 32 has a diameter 34 of about 4 mm to about 6 mm, or about 5 mm.

The first substantially cylindrical section 18 comprises a flattening portion 38 at the outer lateral surface 80 of connector 14. Flattening portion 38 extends along the length extension 26 of the first substantially cylindrical section 18. As further derivable from FIGS. 8 to 10, the flattening portion comprises a recess 40 which forms an inner cavity 82 within the connector 14. A spring-loaded ball element 42 is inserted into cavity 82 and is fixed therein, e.g., by a press-fitting process and/or gluing. The spring-loaded ball element 42 is an element with a snap-fit locking mechanism to provide sufficiently strong connection and stability between head 16 and handle 12 in an axial direction, i.e., along the longitudinal length extension 24 of the connector and toothbrush 10. The spring-loaded ball element 42 comprises a ball 44 and a spring 46, the spring 46 applying a radial force onto the ball 44 towards the outer circumference 48 and outer lateral surface 80 of connector 14. When the brush head 16 is attached to the handle, ball 44 extends slightly beyond the outer lateral surface of the first substantially cylindrical section 18 and arrests in a corresponding recess 70 provided in a hollow portion (66) of the head shaft (cf. FIGS. 11 and 12). Both, the spring 46 and the ball 44 may be made from stainless steel.

The first and the second substantially cylindrical sections 18, 20 have a first and a second outer lateral surface 50, 52, respectively, and the first and the second substantially cylindrical sections 18, 20 are arranged with respect to each other so that a part of the first outer lateral surface 50 and a part the second outer lateral surface 52 are substantially in straight alignment. The flattening portion 38 is arranged opposite the first and second outer surfaces 50, 52 being substantially in straight alignment.

Figure 11:
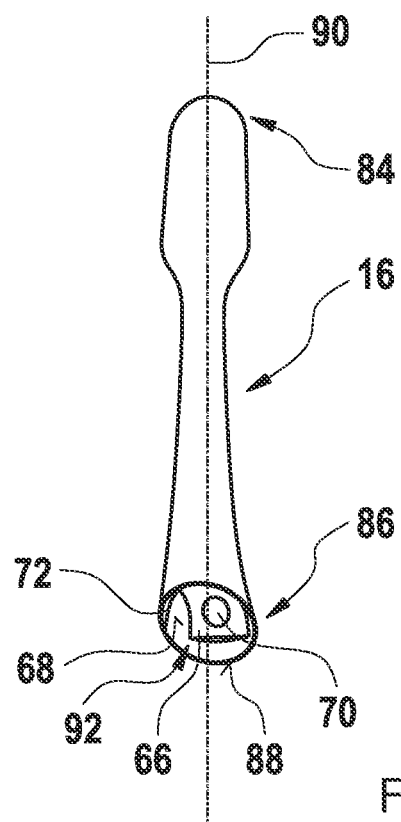
FIG. 11 shows a schematic perspective view of the head of the manual toothbrush of FIG. 1.
Figure 12:
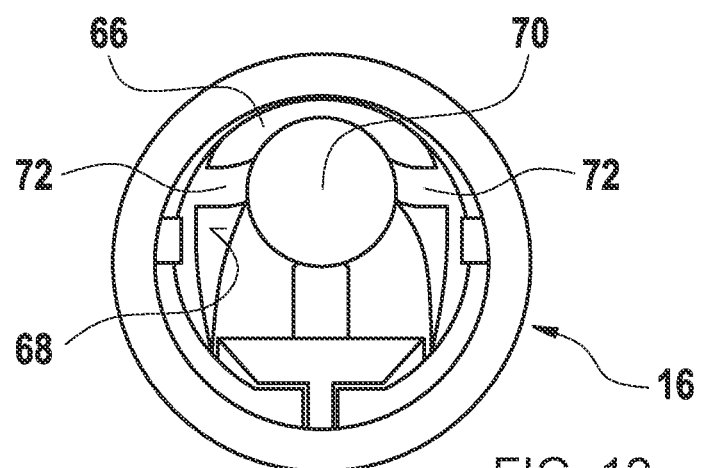
FIG. 12 shows a bottom view of the head of FIG. 11.

FIG. 11 shows a perspective view of brush head 16, and FIG. 12 a respective bottom view. Head 16 comprises hollow portion 66 for receiving the second substantially cylindrical section 20, the at least partially conically shaped section 22 and a part of the first substantially cylindrical section 18 of connector 14. Hollow portion 66 has an inner wall 68 comprising recess 70 for receiving a portion of ball 44 of the spring-loaded ball element 42. Inner wall 68 of hollow portion 66 further comprises two ribs 72 being arranged opposite each other for precisely adjusting the head 16 on the connector 14. In this embodiment, each of the two ribs 72 extends from the inner wall 68 within the hollow portion 66 to the recess 70, as is best shown in FIG. 12.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A replaceable head for removeable connection with a manual toothbrush handle, the head comprising:
    a first end, a second end opposite to the first end, a neck having a hollow portion therein and extending between the first end and the second end, and a bristle carrier disposed adjacent to the first end;
    wherein the second end comprises a second-end opening leading into the hollow portion of the neck;
    wherein the second end terminates with a second-end edge comprising a chamfered surface structured and configured to mate with a corresponding chamfered surface of the handle when the head is connected thereto;
    wherein an inner wall is defined within the hollow portion;
    wherein the inner wall comprises a recess for receiving a spring-loaded ball associated with a connector of the handle, and
    wherein the head comprises at least one rib for precisely adjusting the head on the connector of the handle, the at least one rib extending from the inner wall within the hollow portion to the recess for receiving a spring-loaded ball.

2. The head of claim 1, wherein the recess does not extend all the way through the inner wall.

3. The head of claim 1, wherein the head comprises a front side and a rear side opposite to the front side, wherein the bristle carrier is disposed on the front side, and wherein the recess is situated proximate to the front side.

4. The head of claim 1, wherein the recess is not visible when the head is attached to the connector.

5. The head of claim 1, wherein the recess is visible only through the second-end opening.

6. The replaceable head of claim 3, wherein the chamfered surface of the second end is oriented such that a portion of the second-end edge located on the front side of the head extends further from the first end than a portion of the second-end edge located on the rear side of the head.

7. The head of claim 1, wherein the at least one rib comprises two mutually opposite ribs.

8. A replaceable head for removeable connection with a manual toothbrush handle, the replaceable head comprising:
    a first end, a second end opposite to the first end, a neck extending between the first end and the second end, and a bristle carrier disposed adjacent to the first end;
    wherein the second end comprises a second-end opening leading into a hollow portion of the neck, the hollow portion being defined by an inner wall of the neck;
    wherein the second end comprises a chamfered surface structured and configured to mate with a corresponding chamfered surface of the manual-toothbrush handle;
    wherein the inner wall comprises a recess for receiving a spring-loaded ball associated with a connector of a toothbrush handle,
    wherein the head comprises at least one rib for precisely adjusting the head on the connector of the handle, the at least one rib extending from the inner wall within the hollow portion to the recess for receiving a spring-loaded ball; and
    wherein a distinct haptic feedback is provided to a user upon an engagement interaction between the recess and the spring-loaded ball as the spring-loaded ball snaps into the recess, to alert a user that the head is securely connected to the toothbrush handle as the engagement interaction between the recess and the spring-loaded ball becomes invisible when the head and the handle are connected together.

9. A replaceable head for removeable connection to a manual toothbrush handle, the head comprising:
    a first end, a second end opposite to the first end, a neck extending between the first end and the second end, and a bristle carrier disposed adjacent to the first end;
    wherein the second end comprises an opening leading into a hollow portion of the neck, the hollow portion being defined by an inner wall of the neck, wherein the inner wall comprises a recess for receiving a spring-loaded ball associated with a connector of a toothbrush handle, wherein the recess is visible only through the opening;
    wherein the second end comprises a chamfered surface structured and configured to mate with a corresponding chamfered surface of the handle;
    wherein the opening and the hollow portion are structured and configured for the recess to receive a connector associated with the handle and comprising a spring-loaded ball, to displace the spring-loaded ball from a first position to a second position upon partial connection of the head with the handle, and then permit the spring-loaded ball to return to the first position upon a complete connection of the head with the handle, along with a distinct haptic feedback to alert a user that the head is securely connected to the handle, and
    wherein the head comprises at least one rib for precisely adjusting the head on the connector of the handle, the at least one rib extending from the inner wall within the hollow portion to the recess for receiving a spring-loaded ball.

* * * * *